(12) United States Patent
Abe

(10) Patent No.: US 7,284,568 B2
(45) Date of Patent: Oct. 23, 2007

(54) SAFETY VALVE UNIT

(75) Inventor: Koichi Abe, Gyoda (JP)

(73) Assignee: Surpass Industry Co., Ltd., Saitama (JP)

( * ) Notice: Subject to any disclaimer, the term of this patent is extended or adjusted under 35 U.S.C. 154(b) by 320 days.

(21) Appl. No.: 11/094,243

(22) Filed: Mar. 31, 2005

(65) Prior Publication Data

US 2005/0217731 A1    Oct. 6, 2005

(30) Foreign Application Priority Data

Mar. 31, 2004   (JP) .............................. 2004-104186

(51) Int. Cl.
*F16K 17/06*    (2006.01)
(52) U.S. Cl. .................... 137/515.5; 137/540
(58) Field of Classification Search ............. 137/515.5, 137/524, 540
See application file for complete search history.

(56) References Cited

U.S. PATENT DOCUMENTS

| | | | | |
|---|---|---|---|---|
| 98,697 | A * | 1/1870 | La France | ................ 137/540 |
| 347,213 | A * | 8/1886 | Walker | ........................ 137/524 |
| 1,322,638 | A * | 11/1919 | Smolensky | ................... 137/540 |
| 2,720,890 | A * | 10/1955 | Stroud | ........................ 137/540 |
| 3,255,774 | A * | 6/1966 | Gallagher et al. | ........... 137/524 |
| 3,422,840 | A * | 1/1969 | Brumm et al. | ............ 137/515.5 |
| 4,428,396 | A * | 1/1984 | Wall | ........................ 137/493.9 |
| 4,545,405 | A * | 10/1985 | LaBelle | ........................ 137/524 |
| 4,718,442 | A * | 1/1988 | Nicoll | ...................... 137/515.5 |

* cited by examiner

*Primary Examiner*—John Rivell
(74) *Attorney, Agent, or Firm*—Browdy and Neimark, PLLC

(57) ABSTRACT

A safety valve unit permits its user to perform an adjustment of the valve unit in cracking pressure from the outside in an easy and an adequate manner without disassembling any part of the valve unit in a condition in which the valve unit remains inline-connected with a fluid circuit. The safety valve unit is provided with a rotary barrel member (1), in which a cracking-pressure adjusting portion (4, 5, 6, 7 and 8) is incorporated and driven by the barrel member (1) in order to adjust the cracking pressure. The barrel member (1) has its female screw portion (2) threadably engaged with a male screw portion of the cracking-pressure adjusting portion (4) that is a movable spring support (4). When the barrel member (1) is rotated, the spring support (4) is axially and linearly displaced to adjust the cracking pressure of the valve unit.

12 Claims, 3 Drawing Sheets

SAFETY VALVE UNIT

BACKGROUND OF THE INVENTION

1. Field of the Invention

The present invention relates to a safety valve unit that is generally called "pressure relief valves" in the art, and more particularly to a pressure relief valve unit that is inline-connected with a fluid circuit to control the circuit pressure in a manner such that, when a fluid passage in the circuit is subjected to a fluid pressure more than a predetermined set point called "cracking pressure", the pressure relief valve of the unit is opened to relieve the amount of fluid necessary to maintain such a predetermined set point pressure in the circuit, wherein: the pressure relief valve or safety valve unit also functions as a check valve to prevent fluid from flowing in the reverse direction in the circuit; and, the subject safety valve unit is capable of being adjusted in cracking pressure from the outside.

2. Description of the Related Art

In general, a safety valve unit of a conventional type comprises: a stationary valve body; a spring-biased movable valve element; and, a valve spring for biasing the valve element, wherein both the valve element and the valve spring are housed in the valve body. Cracking pressures for valve openings or closures of the safety valve, are determined by a biasing force exerted by the valve spring. Consequently, a simple adjustment in biasing force of the valve spring is enough to adjust the set point of cracking pressure in the safety valve unit.

Examples of the conventional type of safety valve unit, which are adjustable in cracking pressure, are disclosed in Japanese Patent application Laid-open Nos.: 2003-329155; and 2003-322267, for example. One of these examples of the conventional safety valve unit is shown in FIG. 6. In this example, a valve spring support 54 for supporting a distal end portion of a valve spring 50 located remote from a valve element 52 is displaced relative to a valve body 51 so that a resilient force or biasing force exerted by the valve spring 50 is adjusted.

In this example of the prior art, as is clear from FIG. 6, however, it is necessary for a user to dismount or disassemble the safety valve unit from the fluid line in order to realize a displacement of the valve spring support 54 relative to the valve body 51, because the valve spring support 54 is disposed inside the valve body 51 and threadably engaged with the same body 51. Further, after completion of such disassembly of the safety valve unit, it is necessary for the user to assemble the thus disassembled safety valve unit into the fluid line again. Such disassembling and assembling operations of the safety valve unit are very hard and cumbersome.

In addition, in the conventional safety valve unit having the above construction: the valve body 51 has its opposite end portions threadably engaged with a pair of housings 55, 56 each provided with a coupler in its axially outer end portion; and a sealing member 57 is interposed between an outer peripheral surface of the valve body 51 and an inner peripheral surface of each of the housings 55, 56 to establish a liquid-tight or hermetical compression seal therebetween. However, such sealing member 57 tends to become worse in quality with elapsed time due to wear and like adverse factors, which leads to fluid leakage in the prior art safety valve unit.

SUMMARY OF THE INVENTION

Under such circumstances, the present invention was made to solve the above problems inherent in the prior art. Consequently, it is an object of the present invention to provide a safety valve unit that is free from the above problems inherent in a conventional safety valve unit of cracking-pressure adjustable type, wherein the safety valve unit of the present invention is capable of being adjusted in cracking pressure from the outside without being dismounted or disassembled from a fluid circuit and further without performing any partial disassembly of the safety valve unit.

It is another object of the present invention to provide a safety valve unit free from any fear of fluid leakage such as an air leakage and a leak of liquid, wherein the safety valve unit does not require any air seal and any liquid seal.

In accordance with the present invention, the above object of the present invention is accomplished by providing:

In a safety valve unit capable of being adjusted in cracking pressure, the improvement wherein an adjustment in cracking pressure of the valve unit is performed from the outside without disassembling any part of the valve unit.

In the safety valve unit having the above construction, preferably the valve unit is provided with, a rotary barrel member (1), incorporated in which barrel member (1) is a cracking-pressure adjusting portion (4, 5, 6, 7 and 8), wherein a movable spring support (4) of the cracking-pressure adjusting portion (4, 5, 6, 7 and 8) is driven by the barrel member (1) to adjust the valve unit in cracking pressure.

Further, preferably the barrel member (1) is provided with a female screw portion (2); the female screw portion (2) of the barrel member (1) is threadably engaged with a male screw portion of the movable spring support (4), so that the movable spring support (4) is axially and linearly displaced when the barrel member (1) is rotated in adjusting the valve unit in cracking pressure.

Still further, preferably the cracking-pressure adjusting portion (4, 5, 6, 7 and 8) comprising at least: a valve holder (7) mounted on a valve housing (11); and, the movable spring support (4), wherein the movable spring support (4) has the male screw portion formed in an outer peripheral surface of the movable spring support (4), the movable spring support (4) having one of its opposite axial end surfaces connected with the valve holder (7) through a bellows (5) and the other of its opposite axial end surfaces connected with a bellows body member (8) through another bellows (6), the bellows body member (8) being provided with a line connection opening (16).

Preferably, the cracking-pressure adjusting portion (4, 5, 6, 7 and 8) comprising at least: a valve holder (7) mounted on a valve housing (11); and, the movable spring support (4), wherein the movable spring support (4) has the male screw portion formed in an outer peripheral surface of the movable spring support (4), the movable spring support (4) having one of its opposite axial end surfaces connected with the valve holder (7) through a bellows (5) and the other of its opposite axial end surfaces connected with a bellows body member (8) through another bellows (6), the bellows body member (8) being provided with a line connection opening (16), wherein all the valve holder (7), the movable spring support (4) and the bellows body member (8) are integrally formed with each other into one piece.

Further preferably, the cracking-pressure adjusting portion (4, 5, 6, 7 and 8) comprising at least: the valve holder (7) mounted on a valve housing (11); and, the movable spring support (4), wherein the movable spring support (4) has the-male screw portion formed in an outer peripheral surface of the movable spring support (4), the movable spring support (4) having one of its opposite axial end surfaces connected with the valve holder (7) through a bellows (5) and the other of its opposite axial end surfaces connected with a bellows body member (8) through another bellows (6), the bellows body member (8) being provided with a line connection opening (16).

Still further, preferably all of the valve holder (7), the bellows (5, 6) and the movable spring support (4) are integrally formed with each other into one piece.

The above object of the present invention is also accomplished by providing:

A safety valve unit comprising in combination: a rotary barrel member (1) provided with a female screw portion (2) in its inner peripheral surface; a cracking-pressure adjusting portion (4, 5, 6, 7 and 8) having its intermediate portion disposed inside the rotary barrel member (1); a valve holder (7) formed in an end portion of the cracking-pressure adjusting portion (4, 5, 6, 7 and 8); a valve housing (11) disposed inside the valve holder (7); a valve element (12) disposed inside the valve housing (11); and, a ring member (20) mounted on the valve holder (7), wherein the cracking-pressure adjusting portion (4, 5, 6, 7 and 8) is constructed of: the valve holder (7); the movable spring support (4) provided with the male screw portion in its outer peripheral surface, which male screw portion is threadably engaged with the female screw portion (2) of the rotary barrel member (1), the movable spring support (4) being connected with the valve holder (7) through a bellows (5); a bellows body member (8) connected with the movable spring support (4) through another bellows (6), the bellows body member (8) being provided with a line connection opening (16).

In the safety valve having the above construction, preferably all of the valve holder (7), the movable spring support (4), the bellows body member (8) and the two bellows (5, 6) are integrally formed with each other into one piece.

Further, preferably the safety valve unit further comprises a stopper ring (20) provided with a female screw portion in its inner peripheral surface, which female screw portion is threadably engaged with a male screw portion formed in an outer peripheral surface of an axial half end portion of the rotary barrel member (1), wherein the stopper ring (20) is provided with a substantially circular-shaped opening (21) in one of its opposite axial end surfaces, the opening (21) being provided with a pair of diametrically opposed straight-line portions (22) to assume a substantially circular-shaped form in cross section, wherein the valve holder (7) to be inserted into the stopper ring (2) in assembly is provided with a pair of diametrically opposed flat surface portions (19) which correspond in axial position to the straight-line portions (22) of the opening (21) of the stopper ring (2) in assembly.

Still further, preferably each of the flat surface portions (19) is provided with a scale (19a) for enabling a user to know an axial position of the movable spring support (4) from the outside without disassembling any part of the safety valve unit.

The above object of the present invention is also accomplished by providing:.

A safety valve unit comprising in combination: a rotary barrel member (1) provided with a female screw portion (2) in its inner peripheral surface; a cracking-pressure adjusting portion (4, 5, 6, 7 and 8), an intermediate portion of which is disposed inside the rotary barrel member (1); a valve holder (7) formed in one of opposite axial end portions of the cracking-pressure adjusting portion (4, 5, 6, 7 and 8); a valve housing (11) disposed inside the valve holder (7); a valve element (12) disposed inside the valve housing (11); and, a ring member (20) mounted on the valve holder (7), wherein the cracking-pressure adjusting portion (4, 5, 6, 7 and 8) is constructed of at least: the valve holder (7); and a movable spring (4) provided with a male screw portion in its outer peripheral surface for threadably engaging with the female screw portion (2) of the rotary barrel member (1); and, the movable spring support (4) being connected with the valve holder (7) through a bellows (5).

In the safety valve unit having the above construction, preferably the safety valve unit further comprises a stopper ring (20) provided with a female screw portion in its inner peripheral surface, which female screw portion is threadably engaged with a male screw portion formed in an outer peripheral surface of an axial half end portion of the rotary barrel member (1), wherein the stopper ring (20) is provided with a substantially circular-shaped opening (21) in one of its opposite axial end surfaces, the opening (21) being provided with a pair of diametrically opposed straight-line portions (22) to assume a substantially circular-shaped form in cross section, wherein the valve holder (7) to be inserted into the stopper ring (2) in assembly is provided with a pair of diametrically opposed flat surface portions (19) which correspond in axial position to the straight-line portions (22) of the opening (21) of the stopper ring (2) in assembly.

Further, preferably each of the flat surface portions (19) is provided with a scale (19a) for enabling a user to know an axial position of the movable spring support (4) from the outside without disassembling any part of the safety valve unit.

The effects of the invention are as follows: namely, the safety valve unit of the present invention enables its user to perform an adjustment of the cracking pressure of the valve unit in an easy and an adequate manner without disassembling any part of the valve unit in a condition in which the valve unit remains inline-connected with a fluid circuit. More specifically, it is possible for the user to perform any desired adjustment in cracking pressure of the safety valve unit by simply rotating the rotary barrel member of the valve unit. Therefore, it is possible for the use to perform such an adjustment in cracking pressure of the valve unit efficiently in a short time.

Further, in one of the embodiments of the present invention, some components of the safety valve unit of the present invention are integrally formed with each other into one piece. More specifically, since these components are integrally connected with each other through a plurality of bellows each integrally formed with these components and disposed between adjacent ones of these components, the safety valve unit of the present invention is substantially free from any fear of fluid leakage though the valve unit comprises some movable components.

BRIEF DESCRIPTION OF THE DRAWINGS

The above and other objects, advantages and features of the present invention will be more apparent from the following description taken in conjunction with the accompanying drawings in which.

DETAILED DESCRIPTION OF THE PREFERRED EMBODIMENTS

The best modes for carrying out the present invention will be described in detail using embodiments of the present invention with reference to the accompanying drawings.

A safety valve unit of the present intention is characterized in that: the safety valve unit is adjustable in cracking pressure to permit a user to sake a desired adjustment of the cracking pressure from the outside, without making any disassembly of the valve unit.

Figure 1:
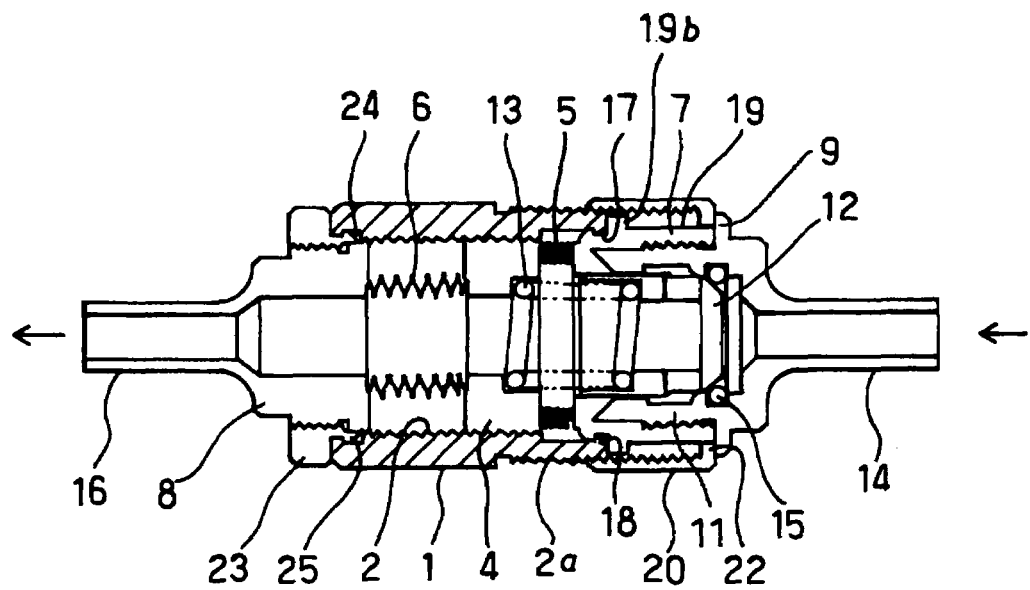
FIG. 1 is a longitudinal sectional view of the safety valve unit of a first embodiment of the present invention, illustrating the rightmost displacement position of the movable spring support.

In a first embodiment of the safety valve unit of the present invention shown in FIG. 1, the safety valve unit is provided with a rotary barrel member 1, incorporated in which barrel member 1 a cracking-pressure adjusting portion. It is possible for a user to adjust the safety valve unit in cracking pressure by driving the cracking-pressure adjusting portion of the valve unit. The accompanying drawings show the details of the embodiments of such valve unit of the present invention.

As shown in FIG. 1, in the first embodiment of the safety valve unit, the rotary barrel member 1 is provided with: a female screw portion 2 in an inner peripheral surface of the barrel member 1; a male screw portion 2a in an outer peripheral surface of one of opposite end portions of the barrel member 1. More specifically, the male screw portion 2a is formed in the outer peripheral surface of the right-hand end portion of the barrel member 1, as viewed in FIG. 1. The safety valve unit of the present invention is provided with a safety valve portion 3, which is provided in the same right-hand side of the barrel member 1 and also serves as a check valve. The above-mentioned cracking-pressure adjusting portion of the safety valve unit is incorporated in the rotary barrel member 1 to cooperate therewith so as to adjust the cracking pressure of the safety valve 3.

In this first embodiment shown in FIG. 1, the cracking-pressure adjusting portion of the valve unit is constructed of: a movable spring support 4 which is threadably engaged with the female screw portion 2 of the rotary barrel member 1; pair of bellows 5, 6 each of which is disposed adjacent to each of opposite axial end surfaces of the movable spring support 4; a valve holder 7 disposed axially outside the right-hand one 5 of the bellows 5, 6 so as to be adjacent to this right-hand bellows 5; and, a bellows body member 8 disposed axially outside the left-hand one 6 of the bellows 5, 6 so as to be adjacent to this left-hand bellows 6, wherein the bellows body member 8 is provided with an outlet connection opening 16 which has a substantially circular-shaped form and extends axially outwardly or leftwardly, as viewed in FIG. 1.

One of important features of the present invention resides in that the safety valve unit of the present invention has its five components (i.e., the movable spring support 4, bellows 5, 6, valve holder 7 and the bellows body member 8) integrally formed with each other into one piece of a fluoropolymer resin. By integrally forming these five components into one piece of the fluororesin, any fluid leakage is prevented from occurring between adjacent ones of these five components of the safety valve unit. In other words, though the safety valve unit of the present invention comprises the movable component 4, any sealing means is not required between adjacent ones of these five components. This is one of large advantages inherent in the safety valve unit of the present invention.

Figure 3:
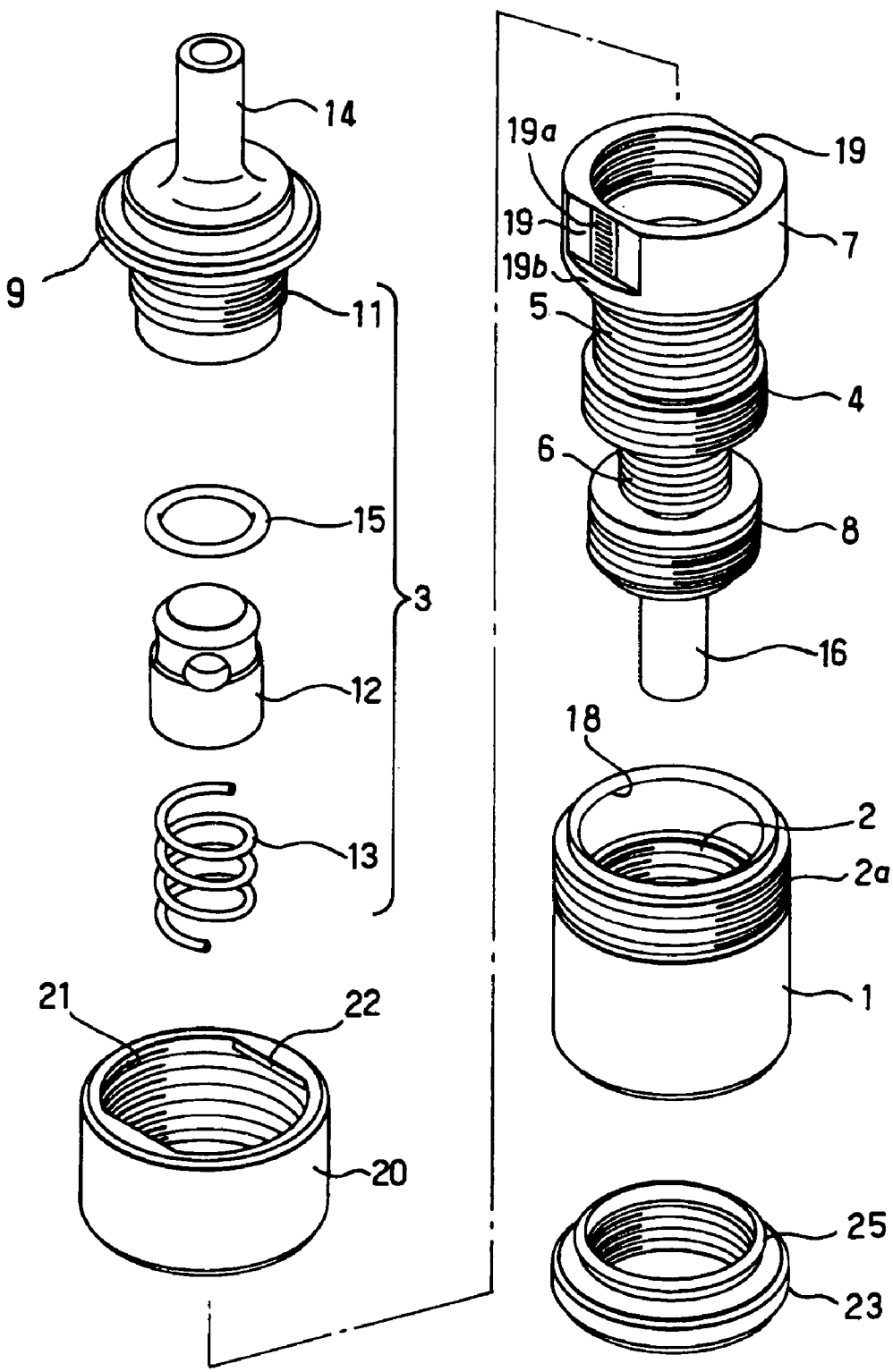
FIG. 3 is a perspective exploded view of the first embodiment of the safety valve unit of the present invention.

As for the safety valve portion 3 of the safety valve unit of the present invention, as shown in FIG. 3, the safety valve portion 3 itself is of a conventional type, and is constructed of: a valve housing 11 which is threadably engaged with the valve holder 7 and housed in the holder 7; a valve element 12 which is movably retained in the valve housing 11; and, a compression coil spring 13 disposed between the movable valve element 12 and the stationary spring support 4. The valve housing 11 is provided with a flange portion 9, which abuts against a right-hand axial end surface of the valve holder 7; and, an inlet connection opening 14 having a substantially circular-shaped form in cross section, through which the safety valve unit is inline-connected with a fluid circuit (not shown)

As viewed in FIG. 1, the valve element 12 is constantly urged axially rightward under the influence of a resilient force exerted by the compression coil spring 13 into its closing position in which the valve element 12 has its axial head surface brought into press-contact with an O-ring 15 to shut off a fluid flow passing through the safety valve portion 3 of the valve unit. In use, when a fluid pressure in the circuit applied to the axial head surface of the valve element 12 becomes larger than the resilient force exerted by the compression coil spring 13, the valve element 12 is moved leftward in FIG. 1 to have its axial head surface separated from the O-ring 15 to permit fluid to pass through the safety valve unit. The resilient force exerted by the compression coil spring 13 can be adjusted by turning the barrel member 1. When the user turns the barrel member 1 relative to the remaining portion of the safety valve unit, the movable spring support 4 is axially moved so that the compression coil spring 13 is more compressed or expanded, whereby the initial resilient force exerted by the compression coil spring 13 is adjusted.

Figure 4:
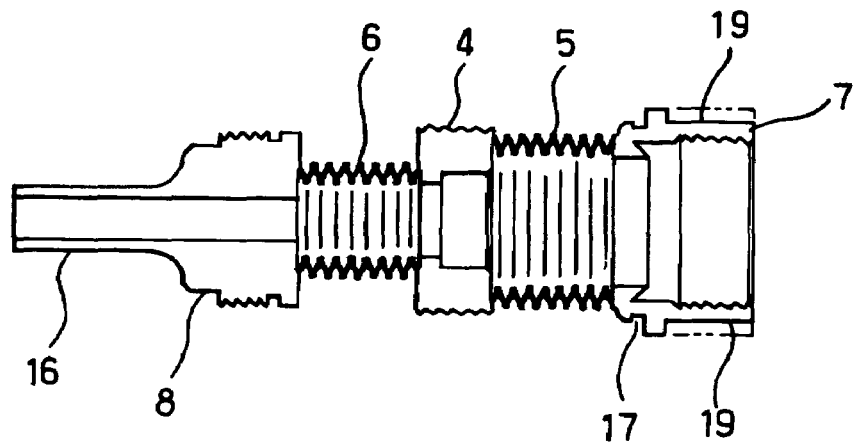
FIG. 4 a longitudinal sectional view of the safety valve unit of the first embodiment of the present invention, illustrating the details of the cracking-pressure adjusting portion of the first embodiment.

As is clear from FIG. 1, the valve holder 7 is provided with a bellows mounting end portion, in which portion the bellows 5 has its right-hand axial end portion fixedly mounted. The bellows mounting end portion of the valve holder 7 is housed in the rotary barrel member 1, and is provided with an annular engaging groove 17, as shown in FIGS. 1 and 4. On the other hand, as is clearly shown in FIG. 2, an annular nail portion 18 is formed in an inner peripheral surface of a right-hand axial end portion of the barrel member 1 to correspond in position to the annular engaging groove 17 of the valve holder 7, and is slidably engaged with this annular engaging groove portion 17 of the valve holder 7.

When engagement between the annular nail portion 18 of the barrel member 1 and the annular engaging groove portion 17 of the valve holder 7 is established, it is possible to prevent the barrel member 1 from dropping out of the valve holder 7. Further, since the annular nail portion 18 of the barrel member 1 is slidably engaged with the annular engaging groove portion 17 of the valve holder 7, it is possible to turn the barrel member 1 relative to the valve holder 7.

As is clear from FIGS. 3 and 4, the valve holder 7 has its large-diameter portion disposed adjacent to the annular groove portion 17, which large-diameter portion is partially cut off to form a pair of diametrically opposed flat surface portions 19. The other area of the large-diameter portion of the valve holder 7 after completion of such cutting-off operation form a pair of diametrically opposed restriction walls 19b. Preferably, each of the flat surface portions is provided with a scale 19a for indicating a displacement of a stopper ring 20, which will be described later. The stopper ring 20, in which the valve holder 7 is housed, is constructed of a cylindrical element, and has its inner peripheral surface threaded to form a female screw portion therein. As shown in FIG. 3, the stopper ring 20 is provided with an axial end opening 21 having a substantially circular-shaped form in cross section, in which opening 21 a pair of diametrically opposed sector portions each including a straight-line portion 22 are formed. These sector portions of the stopper ring 20 correspond in position to the flat surface portions 19 of the valve holder 7.

In assembling the components into the safety valve unit, the male screw portion 2a formed in the righthand end portion of the barrel member 1 is inserted into the stopper ring 20 from the left-hand side of the stopper ring 20 as viewed in FIG. 1 in a condition in which the valve holder 7 has been already inserted into the stopper ring 20, and is then threadably engaged with the female screw portion of the stopper ring 20. At this time, the flat surface portions 19 of the valve holder 7 are brought into contact with the straight-line portions 22 of the opening 21 of the stopper ring 20.

A retaining collar 23 is threadably engaged with the bellows body member 8 to support a right-hand axial end portion of the bellows body member 8 inside a left-hand axial end portion of the barrel member 1, as viewed in FIG. 1. More specifically, an annular engaging groove 24 is formed in an inner peripheral surface of the left-hand axial end portion of the barrel member 1. Slidably engaged with this annular engaging groove 24 of the barrel member 1 is an annular nail portion 25 formed in an outer peripheral surface of the right-hand axial end portion of the retaining collar 23, as viewed in FIG. 2.

The retaining collar 23 has its annular nail portion 25 snapped into the annular engaging groove 24 of the barrel member 1. Such snapped-in engagement established between the retaining collar 23 and the barrel member 1 enables the barrel member 1 to slidably rotate relative to the retaining collar 23 without any fear of dropping out of the retaining collar 23 in adjusting the cracking pressure of the safety valve unit.

In the safety valve unit having the above construction, when the barrel member 1 is turned from the outside in a condition in which the safety valve unit is inline-connected with the fluid circuit, any torque applied to the barrel member from the outside is not transmitted to the retaining collar 23 to permit the barrel member 1 to freely rotate relative to the retaining collar 23. At this time, the bellows body member 8 having been threadably engaged with the retaining collar 23 remains stationary together with the retaining collar 23 even when the barrel member 1 is turned.

As for the movable spring support 4 having been threadably engaged with the female screw portion 2 of the barrel member 1, since both the valve holder 7 and the bellows body member 8 remain stationary, and since both of the bellows 5, 6 are fixedly mounted on the spring support 4, the spring support 4 having the above construction is prevented from being turned together with the barrel member 1 but permitted to be axially displaced relative to the valve holder 7, which permits the user to adjust the safety valve unit in cracking pressure.

As for the stopper ring 20 having been threadably engaged with the male screw portion 2a of the rotary barrel member 1, the straight-line portions 22 of the stopper ring 20 are brought into area contact with the flat surface portion 19 of the valve holder 7. Due to this, the stopper ring 20 can't be rotated together with the rotary barrel member 1 when the barrel member 1 is rotated. However, since the stopper ring 20 has its female screw portion threadably engaged with the male screw portion 2a of the rotary barrel member 1, the stopper ring 20 is axially displaced along the length of the compression coil spring 13 when the barrel member 1 is rotated by the user.

Figure 2:
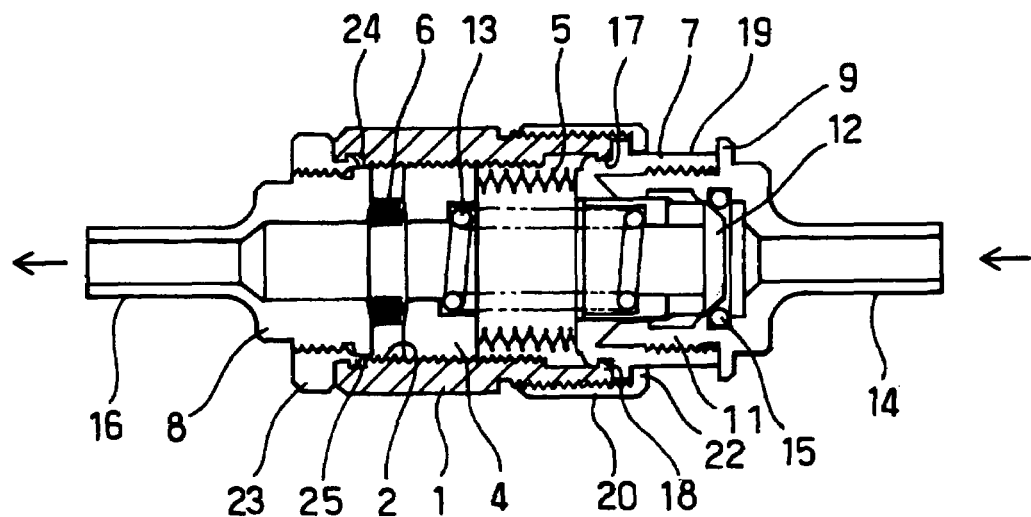
FIG. 2 is a longitudinal sectional view of the safety valve unit of the first embodiment of the present invention, illustrating the leftmost displacement position of the movable spring support.

When the stopper ring 20 is axially displaced to have its straight-line portions 22 brought into contact with the corresponding pair of the diametrically opposed restriction walls 19b disposed adjacent to the flat surface portions 19 of the valve holder 7, the thus established contact between the stopper ring 20 and the valve holder 7 prevents any further axial displacement of the stopper ring 20 from being made, which also prevents any further clockwise rotation of the rotary barrel member 1 from being made by the user, whereby any further axial displacement of the movable spring support 4 is restricted, as shown in FIG. 2.

When the rotary barrel member 1 is thee rotated counterclockwise, the stopper ring 20 begins to be axially displaced in the reverse direction, so that the straight-line portions 22 of the stopper ring 20 are eventually brought into contact with the flange portion 9 of the valve housing 11 to prevent any further counterclockwise rotation of the barrel member 1 from being made by the user. This also prevents any further axial displacement of the movable spring support 4 in the reverse direction from being made, as shown in FIG. 1. As is clear from the above description, the stopper ring 20 is capable of performing such restriction function.

The amount of axial displacement of the stopper ring 20 is made proportional to the amount of axial displacement of the movable spring support 4. Due to this, it is possible for the user to know any axial position of the movable spring support 4 through a scale 19a provided in each of the flat surface portions 19 of the valve holder 7 even when the user can't watch the movable spring support 4 itself from the outside. In other words, due to such provisions of the scales 19a in the flat surface portions 19 of the valve holder 7, it is possible for the user to perform any desired adjustment of the cracking pressure of the safety valve unit of the present invention in an easy and an adequate manner.

FIG. 4 shows a second embodiment of the safety valve unit of the present invention. This second embodiment is different from the first embodiment in construction of the cracking-pressure adjusting portion of the valve unit.

Figure 5:
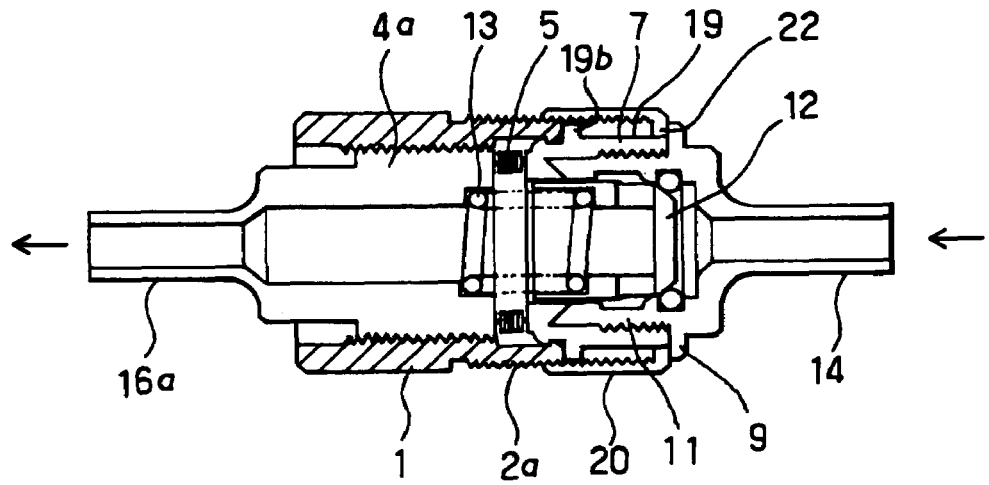
FIG. 5 is a longitudinal sectional view of a second embodiment of the safety valve unit of the present invention, illustrating the details of the cracking-pressure adjusting portion of the second embodiment.
Figure 6:
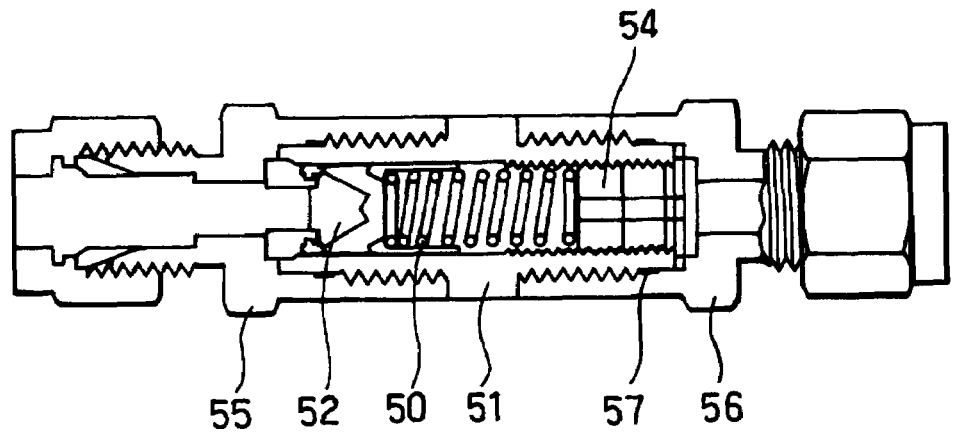
FIG. 6 is a longitudinal sectional view of the safety valve unit of the prior art, illustrating the conventional cracking-pressure adjusting portion of the valve unit.

In the cracking-pressure adjusting portion of the second embodiment of the safety valve unit shown in FIG. 5: the bellows 6 is removed; and, the bellows body member 8 and the movable spring support 4 are integrally formed with each other into one piece. Due to this, this second embodiment of the safety valve unit is provided with a movable spring support 4a in place of that 4 of the first embodiment. The movable spring support 4a used in the second embodiment is provided with an outlet connection opening 16a in place of that 16 of the first embodiment, wherein the opening 16a has a substantially circular-shaped form in cross section. Due to the above construction in the second embodiment, when the movable spring support 4a of the second embodiment is axially displaced, its outlet connection opening 16a is also axially displaced together with the movable spring support 4a, as is clear from FIG. 5.

As is in the first embodiment shown in FIGS. 1 to 4, in the second embodiment shown in FIG. 5 too: all three components, i.e., the movable spring support 4a, bellows 5 and the valve holder 7 are integrally formed with each other into one piece to prevent any possible fluid leakage between adjacent ones of these components. The second embodiment is capable of enjoying substantially the same action/effect as that of the first embodiment.

While the present invention has beer particularly shown and described in detail with reference to the preferred embodiments thereof, it will be understood by those skilled in the art that various changes or modifications in form and details may be made therein without departing from the spirit and scope of the present invention as defined by the appended claims.

Finally, the present application claims the Convention Priority based Japanese Patent Application No. 2004-104186 filed on Mar. 31, 2004, which is herein incorporated by reference.

What is claimed is:

1. In a safety valve unit capable of being adjusted in cracking pressure, the improvement wherein an adjustment in cracking pressure of said valve unit is performed from the outside without disassembling any part of said valve unit;
    wherein said valve unit is provided with a rotary barrel member (1), incorporated in which barrel member (1) is a cracking-pressure adjusting portion (4, 5, 6, 7 and 8), wherein a movable spring support (4) of said cracking-pressure adjusting portion (4, 5, 6, 7 and 8) is driven by said barrel member (1) to adjust said valve unit in cracking pressure; and
    said barrel member (1) is provided with a female screw portion (2); said female screw portion (2) of said barrel member (1) is threadably engaged with a male screw portion of said movable spring support (4), so that said movable spring support (4) is axially and linearly displaced when said barrel member (1) is rotated in adjusting said valve unit in cracking pressure.

2. In a safety valve unit capable of being adjusted in cracking pressure, the improvement wherein an adjustment in cracking pressure of said valve unit is performed from the outside without disassembling any part of said valve unit;
    wherein said valve unit is provided with a rotary barrel member (1), incorporated in which barrel member (1) is a cracking-pressure adjusting portion (4, 5, 6, 7 and 8), wherein a movable spring support (4) of said cracking-pressure adjusting portion (4, 5, 6, 7 and 8) is driven by said barrel member (1) to adjust said valve unit in cracking pressure; and
    wherein said cracking-pressure adjusting portion (4, 5, 6, 7 and 8) comprises at least: a valve holder (7) mounted on a valve housing (11); and,
    wherein said movable spring support (4) has said male screw portion formed in an outer peripheral surface of said movable spring support (4), said movable spring support (4) having one of its opposite axial end surfaces connected with said valve holder (7) through a bellows (5) and the other of its opposite axial end surfaces connected with a bellows body member (8) through another bellows (6), said bellows body member (8) being provided with a line connection opening (16).

3. The safety valve unit as set forth in claim 2, wherein all said valve holder (7), said bellows (5, 6) and said movable spring support (4) are integrally formed with each other into one piece.

4. In a safety valve unit capable of being adjusted in cracking pressure, the improvement wherein an adjustment in cracking pressure of said valve unit is performed from the outside without disassembling any part of said valve unit;
    wherein said valve unit is provided with a rotary barrel member (1), incorporated in which barrel member (1) is a cracking-pressure adjusting portion (4, 5, 6, 7 and 8), wherein a movable spring support (4) of said cracking-pressure adjusting portion (4, 5, 6, 7 and 8) is driven by said barrel member (1) to adjust said valve unit in cracking pressure; and
    wherein said cracking-pressure adjusting portion (4, 5, 6, 7 and 8) comprises at least: a valve holder (7) mounted on a valve housing (11); and, said movable spring support (4), wherein said movable spring support (4) has said male screw portion formed in an outer peripheral surface of said movable spring support (4), said movable spring support (4) having one of its opposite axial end surfaces connected with said valve holder (7) through a bellows (5) and the other of its opposite axial end surfaces connected with a bellows body member (8) through another bellows (6), said bellows body member (8) being provided with a line connection opening (16), wherein all said valve holder (7), said movable spring support (4) and said bellows body member (8) are integrally formed with each other into one piece.

5. A safety valve unit comprising in combination: a rotary barrel member (1) provided with a female screw portion (2) in its inner peripheral surface; a cracking-pressure adjusting portion (4, 5, 6, 7 and 8) having its intermediate portion disposed inside said rotary barrel member (1); a valve holder (7) formed in an end portion of said cracking-pressure adjusting portion (4, 5, 6, 7 and 8); a valve housing (11) disposed inside said valve holder (7); a valve element (12) disposed inside said valve housing (11); and, a ring member (20) mounted on said valve holder (7), wherein said cracking-pressure adjusting portion (4, 5, 6, 7 and 8) is constructed of: said valve holder (7); a movable spring support (4) provided with a male screw portion in its outer peripheral surface, which male screw portion is threadably engaged with said female screw portion (2) of said rotary barrel member (1), said movable spring support (4) being connected with said valve holder (7) through a bellows (5); a bellows body member (8) connected with said movable spring support (4) through another bellows (6), said bellows body member (8) being provided with a line connection opening (16).

6. The safety valve unit as set forth in claim 5, wherein all said valve holder (7), said movable spring support (4), said bellows body member (8) and two bellows (5, 6) are integrally formed with each other into one piece.

7. The safety valve unit as set forth in claim 5, wherein the safety valve unit further comprises a stopper ring (20) provided with a female screw portion in its inner peripheral surface, which female screw portion is threadably engaged with a male screw portion formed in an outer peripheral surface of an axial half end portion of said rotary barrel member (1), wherein said stopper ring (20) is provided with a substantially circular-shaped opening (21) in one of its opposite axial end surfaces, said opening (21) being provided with a pair of diametrically opposed straight-line portions (22) to assume a substantially circular-shaped form in cross section, wherein said valve holder (7) to be inserted into said stopper ring (2) in assembly is provided with a pair of diametrically opposed flat surface portions (19) which correspond in axial position to said straight-line portions (22) of said opening (21) of said stopper ring (2) in assembly.

8. The safety valve unit as set forth in claim 7, wherein each of said flat surface portions (19) is provided with a scale (19*a*) for enabling a user to know an axial position of said movable spring support (4) from the outside without disassembling any part of the safety valve unit.

9. A safety valve unit comprising in combination: a rotary barrel member (1) provided with a female screw portion (2) in its inner peripheral surface; a cracking-pressure adjusting portion (4, 5, 6, 7 and 8), an intermediate portion of which is disposed inside said rotary barrel member (1); a valve holder (7) formed in one of opposite axial end portions of said cracking-pressure adjusting portion (4, 5, 6, 7 and 8); a valve housing (11) disposed inside said valve holder (7); a valve element (12) disposed inside said valve housing (11); and, a ring member (20) mounted on said valve holder (7), wherein said cracking-pressure adjusting portion (4, 5, 6, 7 and 8) is constructed of at least: said valve holder (7); and a movable spring support (4) provided with a male screw portion in its outer peripheral surface for threadably engaging with said female screw portion (2) of said rotary barrel member (1); said movable spring support (4) being connected with said valve holder (7) through a bellows (5).

10. The safety valve unit as set forth in claim 9, wherein all said valve holder (7), said movable spring support (4), said bellows (5) are integrally formed with each other into one piece.

11. The safety valve unit as set forth in claim 9, wherein the safety valve unit further comprises a stopper ring (20) provided with a female screw portion in its inner peripheral surface, which female screw portion is threadably engaged with a male screw portion formed in an outer peripheral surface of an axial half end portion of said rotary barrel member (1), wherein said stopper ring (20) is provided with a substantially circular-shaped opening (21) in one of its opposite axial end surfaces, said opening (21) being provided with a pair of diametrically opposed straight-line portions (22) to assume a substantially circular-shaped form in cross section, wherein said valve holder (7) to be inserted into said stopper ring (2) in assembly is provided with a pair of diametrically opposed flat surface portions (19) which correspond in axial position to said straight-line portions (22) of said opening (21) of said stopper ring (2) in assembly.

12. The safety valve unit as set forth in claim 11, wherein each of said flat surface portions (19) is provided with a scale (19*a*) for enabling a user to know an axial position of said movable spring support (4) from the outside without disassembling any part of the safety valve unit.

\* \* \* \* \*